UNITED STATES PATENT OFFICE.

THOMAS B. WYLIE, OF PITTSBURGH, PENNSYLVANIA.

PROPORTIONAL GAS-METER.

1,226,158.  Specification of Letters Patent.  Patented May 15, 1917.

Application filed March 29, 1916. Serial No. 87,611.

*To all whom it may concern:*

Figure 1:
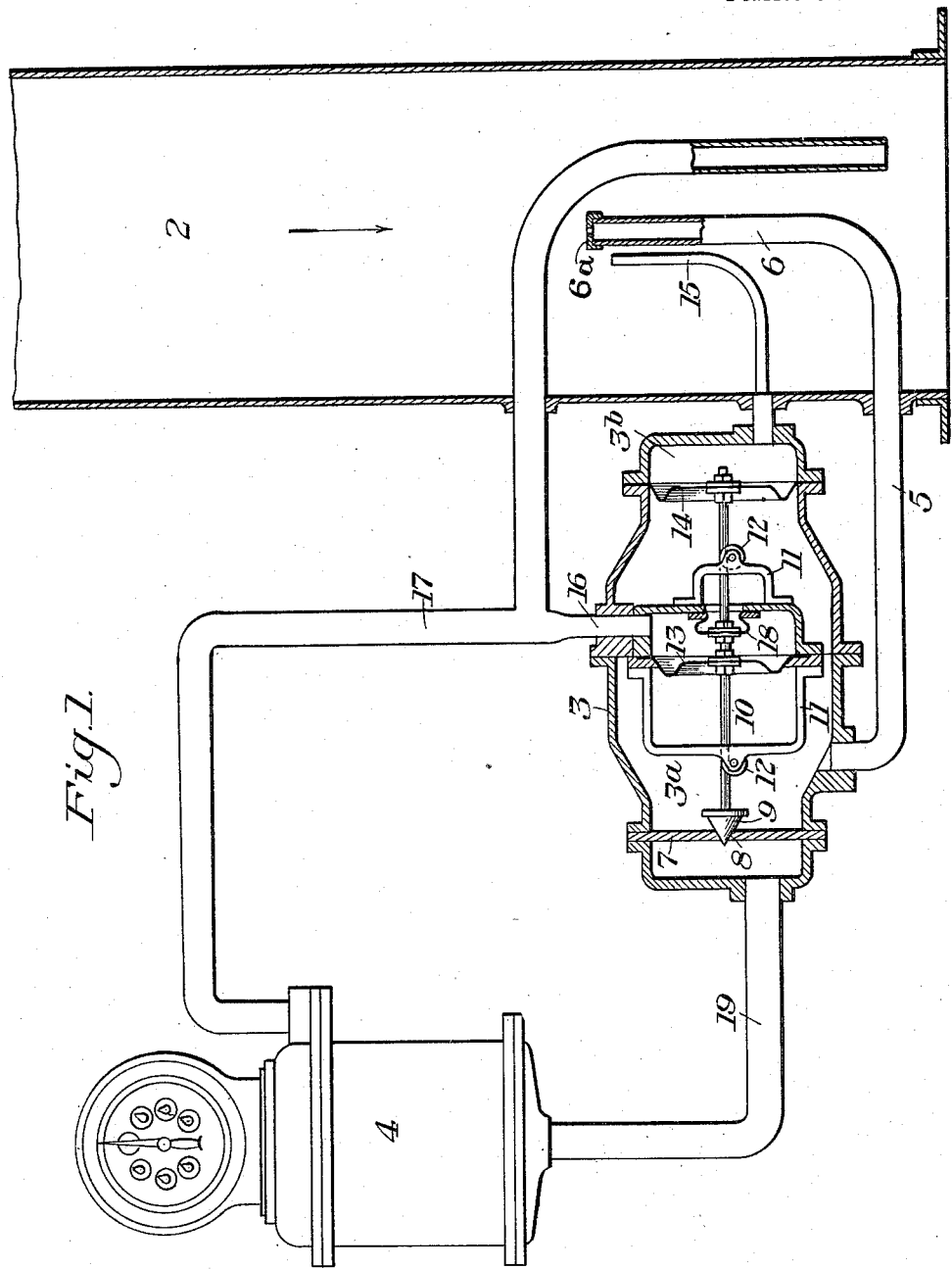
Figure 2:
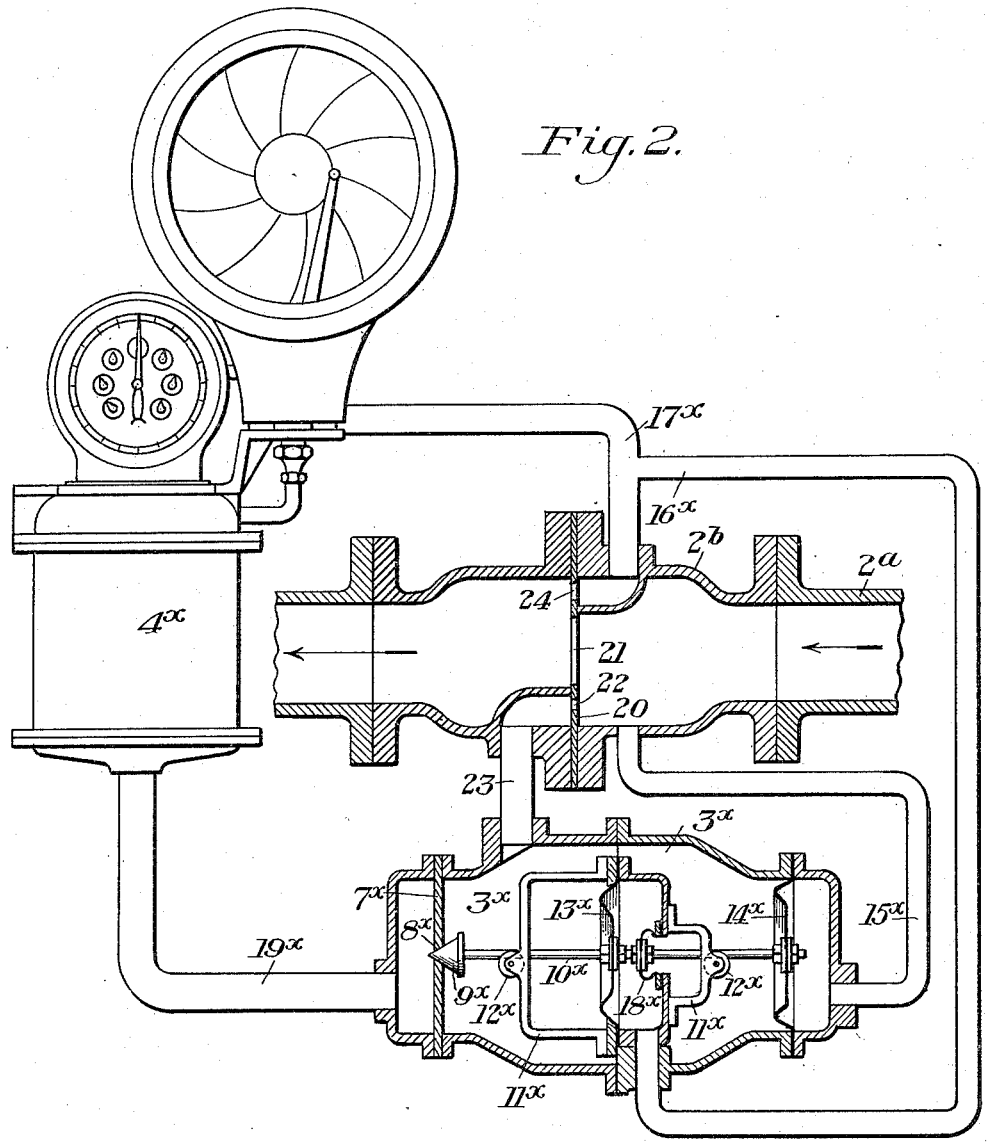

Be it known that I, THOMAS B. WYLIE, a citizen of the United States, residing at Pittsburgh, in the county of Allegheny and State of Pennsylvania, have invented a new and useful Improvement in Proportional Gas-Meters, of which the following is a full, clear, and exact description, reference being had to the accompanying drawings, forming part of this specification, in which:

Figure 1 is a view partly in elevation and partly in section and largely diagrammatic of one form of apparatus embodying my invention; and Fig. 2 is a similar view showing another embodiment of my invention.

My invention has relation to proportional gas meters of the general class described and claimed in my Patent No. 638,791, dated December 12, 1899. The invention is designed to simplify and improve the action of the meter in a number of important respects.

In the meter of said patent, I provided a valve for the unmeasured flow, connected to a valve for the measured flow, these valves and their connections being located within the main conduit or flow channel, the valve for the unmeasured flow acting to change the static pressure at the two sides of the valve. These parts were more or less difficult of access and to keep in perfect working order. In accordance with my present invention, I do away with said valve and with all moving parts in the main conduit, and provide a constant area of flow channel for the proportional measured volume of fluid. I also simplify the arrangement of and connections between the two diaphragms in the controlling chamber.

In accordance with my present invention, the moving parts of the apparatus, including the valves and diaphragms, are located wholly in the controlling chamber outside of the gas main or conduit and in a position where they are readily accessible.

The only valve which is employed in my present apparatus is that which controls and corrects the flow from the controlling chamber to and through the tally meter, in accordance with the variations in the drop in pressure through said meter.

Referring first to that form of my invention shown in Fig. 1, the numeral 2 designates a conduit or main for the flow of gas or other fluid to be measured. 3 designates a controlling chamber which is preferably made in a number of sections secured together by means of bolting flanges so as to enable the parts to be quickly assembled or taken apart, and which is located exterior of the main 2. 4 designates the tally meter which may be of any usual or suitable construction. The controlling chamber 3 has a main portion $3^a$, which is connected by a pipe 5, forming an extension of the Pitot tube 6, extending within the main 2 in a direction opposed to the flow of gas therethrough. The tube 6 has an orificed cap $6^a$, at its inlet end, preferably removable, so that different caps with different sizes of orifices may be used at will. At one end of the portion $3^a$ of the chamber 3 is a valve plate 7 having an orifice 8, which is controlled by a valve 9, carried by a stem 10. This stem is preferably supported for free endwise movement, and for this purpose, I provide the chamber with the supporting members 11, having antifriction rollers 12, upon which the stem 10 rests. 13 and 14 designate two flexible diaphragms or pressure plates connected to the stem 10. These two plates in the form shown have equally exposed areas. 15 is a smaller Pitot tube, extending within the main 2, and communicating with an end chamber $3^b$, behind the pressure plate 14. I term the pressure behind this diaphragm the "high" pressure. The other side of said pressure plate is exposed to the pressure in the portion $3^a$ of the chamber, as is also one side of the pressure plate 13. This pressure I term the "intermediate" pressure. The other side of the pressure plate 13 has a connection 16, communicating with a return pipe 17, leading from the tally meter into the main tube. This connection gives what I term the "low" pressure at this side of the plate 13. 18 designates a flexible sealing member for the stem 10. 19 is a connection leading from the valve end of the controlling chamber to the tally meter.

The operation is as follows: The intermediate pressure in the controlling chambers is dependent upon the dynamic plus the static pressure in the main 2, and the extent of opening of the valve 9. The high pressure at the right hand side of the plate or diaphragm 14 is dependent solely upon the dynamic plus the static pressure in the main 2. The low pressure at the right hand side of plate or diaphragm 13 is dependent upon the static pressure in the main 2. The pressures acting to balance the valve 9 are as stated by the following equation, where the two diaphragms have equal exposed areas: the high pressure minus the intermediate pressure equals the intermediate pressure minus the low pressure. The valve 9 will therefore automatically take care of changes in the dynamic pressure in the main 2, as well as any changes in the drop in pressure through the tally meter. If the diaphragms are of unequal areas as they may be, the above equation, of course, does not hold good. If it be assumed, for instance, that the diaphragm 13 has the exposed area $a$, and the diaphragm 14 the exposed area $2a$, then the equation becomes: $P'a$ equals $P2a$, in which $P'$ equals the intermediate pressure minus the low pressure, and $P$ the high pressure minus the intermediate pressure.

This form of my invention is practically applicable to conditions where the flow is large in volume and the changes in volume are relatively small and not exceeding fifty per cent. of the maximum.

The form of my invention shown in Fig. 2 makes use of static pressures instead of dynamic pressures, but is generally similar to that first described. Instead of Pitot tubes, I employ an orifice plate 20 in the main $2^a$, the latter preferably having an interposed sectional fitting $2^b$, in which the said plate is secured. This permits the use of different plates interchangeably with different sizes of orifices. The plate 20 has a main orifice 21, for the unmeasured flow of gas and a smaller orifice 22 for the proportional flow into the connection 23, leading to the central portion of the control chamber $3^x$. Plate 20 also has a third orifice 24, which forms the return connection into the main from the tally meter through the pipe $17^x$. The other parts are substantially the same as in Fig. 1, and have been given the same reference characters with the letter "x" affixed thereto.

The advantages of my invention will be apparent to those familiar with this class of meters, since it provides a very simple and accurate instrument of this character. But a single valve is required, this valve being controlled by two simple diaphragms or pressure plates located within a controlling chamber, which is wholly exterior of the gas pipe or main and whose contained parts are readily accessible. No levers or other complicated moving parts are required for the control of the valves.

I do not desire to limit myself to the particular construction and arrangement of parts which I have herein shown and described, as it is obvious that these may be varied in various ways without departing from the spirit and scope of my invention, as defined in the appended claims.

I claim:—

1. In a proportional meter, a tally meter, a controlling chamber having a constant area open proportional flow channel leading to a conduit containing the flowing fluid to be measured, and also having an outlet connection to the tally meter and a return connection from the tally meter, a valve controlling the said outlet, and two pressure plates in said chamber connected directly to the stem of said valve, both of said plates being exposed on one side to the intermediate pressure in said chamber, and one pressure plate being exposed on its other side to the high pressure, and the other pressure plate being exposed on its other side to the low or static pressure, substantially as described.

2. In a proportional meter, the combination with a flow conduit and a tally meter, of a control chamber exterior of said conduit and having a constantly open constant area proportional flow connection with the conduit and also having a connection with opposite sides of the tally meter, a valve controlling the flow from the control chamber to the tally meter, and two pressure plates in the control chamber and operatively connected to the valve, both of said plates being exposed to the intermediate pressure at one side, and one plate being exposed to the high pressure on its opposite side, and the other pressure plate being exposed to the low or static pressure at its opposite side, substantially as described.

3. In apparatus of the character described, the combination with a conduit having a constantly full-open flow passage for the unmeasured gas, a controlling chamber having a constantly full-open proportional flow passage connection with said conduit, a tally meter connected to the controlling chamber, a valve controlling the flow from the said chamber to the tally meter, and a pressure plate system connected to said valve and controlling its extent of opening in accordance with changes in the flow in said conduit, substantially as described.

4. A proportional meter comprising in combination with a main flow channel a tally meter, a controlling chamber having a connection with opposite sides of the tally meter and having a valve controlling the outlet connection from the chamber to said tally meter, two pressure plates in said chamber connected to said valve, a connection leading from the main flow channel into said chamber between said plates and terminating in a Pitot tube in said channel, and another Pitot tube in said channel connected with a space in said chamber behind one of said plates, and a static or low pressure connection leading from behind the other plate into the main flow channel, substantially as described.

5. In a proportional meter, the combination with a flow conduit and a tally meter, of a control chamber exterior of said conduit and having a constantly open constant area proportional flow connection with the conduit and also having a connection with the inlet side of the tally meter and a static or low pressure connection with said flow conduit, a valve controlling the flow from the control chamber to the tally meter, and two pressure plates in the control chamber and operatively connected to the valve, both of said plates being exposed to the intermediate pressure at one side, and one plate being exposed to the high pressure at one side, and the other plate being exposed at its opposite side to the low or static pressure, together with means whereby the area of the proportional flow channel while normally constant may be changed at will, substantially as described.

In testimony whereof, I have hereunto set my hand.

THOMAS B. WYLIE.

Witnesses:
W. C. LYON,
H. M. CORWIN.

Copies of this patent may be obtained for five cents each, by addressing the "Commissioner of Patents, Washington, D. C."